US005371932A

United States Patent [19]

Bryan et al.

[11] Patent Number: 5,371,932

[45] Date of Patent: Dec. 13, 1994

[54] MULTIPLE VALVE SPRING COMPRESSOR

[76] Inventors: Kenny L. Bryan; Randy J. Bryan, both of 9909 S. Clegern, Oklahoma City, Okla.

[21] Appl. No.: 137,430

[22] Filed: Oct. 18, 1993

[51] Int. Cl.[5] ............................................. B23P 19/04

[52] U.S. Cl. ..................................................... 29/216

[58] Field of Search .................... 269/79; 29/215, 216, 29/252, 281.4, 281.3

[56] References Cited

U.S. PATENT DOCUMENTS

| | | | |
|---|---|---|---|
| 1,544,070 | 10/1927 | Martin | 29/216 |
| 1,592,898 | 7/1926 | Mummert | 29/216 |
| 1,697,921 | 1/1929 | Krogman | 29/215 |
| 2,826,809 | 3/1958 | Lapastora | 269/79 |

*Primary Examiner*—Robert C. Watson

[57] ABSTRACT

A multiple valve spring compressor consists of a rectangular base of sufficient size to support the entire structure, an upper frame member being of a rectangular u-shape, is attached at each end to the base with an expandable device attached at it's center point. The expandable device which applies force to compress multiple valve springs is connected to a compression plate that is rectangular and has an elongated slot, the compression plate contacts the valve springs retainer during operation, upon compression of the valve springs, the stems and locks will pass thru the elongated slot for removal or installation.

To align the valve springs with the compression plate, a head mounting table; which the cylinder head being worked on will rest upon, can be adjusted to various angles of tilt and pivot.

1 Claim, 1 Drawing Sheet

MULTIPLE VALVE SPRING COMPRESSOR

BACKGROUND—FIELD OF INVENTION

The present Invention relates to valve spring compressors for the purpose of removing or installing valve springs of internal combustion engines.

BACKGROUND—PRIOR ART

Current designs of valve spring compressors have work force applied by either a hand operated lever or by a pneumatic piston, operated by hand and powered through an air compressor system or use a portable hydraulic system.

Common to these designs are a clamp fixture that fits over the cylinder head, usually made of flat steel or round tubing and are designed to compress one valve spring at a time.

The drawbacks to these prior inventions are:

(a) Excessive work and fatigue placed upon the worker by having to lift and hold the clamp fixture while compressing each individual valve spring in order to assemble or disassemble a cylinder head for repair.

(b) Loss of time and profit by having a worker perform the repetitive act of compressing each individual valve spring.

Examples of such prior art are established in U.S. Pat. Nos. Re. 3,038,247, 3,668,765, 4,376,331 and in our U.S. Pat. No. 5,052,091 issued on Oct. 1, 1991 which made improvements in power, durability and portability over previous designs.

SUMMARY OF THE INVENTION

The invention presented here was designed with improvements over common valve spring compressor designs and is a departure from previous embodiments.

This departure is based upon a design which allows a worker to place a cylinder head to be assembled/disassembled onto the valve spring compressor, much as one would onto a work bench when using valve spring compressors of previous design, and then actuate an expandable devices, such as an hydraulic ram, that has been connected to the multiple valve spring compressor, and thus, compress all of the valve springs on the cylinder head at once, thereby eliminating the need to continuously lift and hold a c-clamp type fixture time and time again in order to compress each individual spring.

This design not only relieves the worker from undue stress and fatigue, but also increases profitability for a workshop are to a decrease in wasted time.

Other advantages of this design are:

(a) Increased durability, due to the fact that no part of our invention is to be lifted in order to compress valve springs, and the base must be of sufficient size and mass in order to be stable, while holding a cylinder head inplace, also the upper frame member must be of sufficient size as to be able to compress multiple valve springs, therefore the base and frame can be of a robust size without being a hinderance to a worker.

(b) Increase in productivity, due to the designs ability to compress more than one valve spring at a time.

(c) Elimination of strain a worker must indure when using common valve spring compressors, by having to continuously lift and hold the c-clamp fixture.

Furtheremore, our design allows a cylinder head, placed onto it's head mounting table, to be tilted and pivoted along it's axis, so as to accommodate usage with a multitude of various cylinder head casting designs.

DETAILED DESCRIPTION OF THE INVENTION

Figure 1:
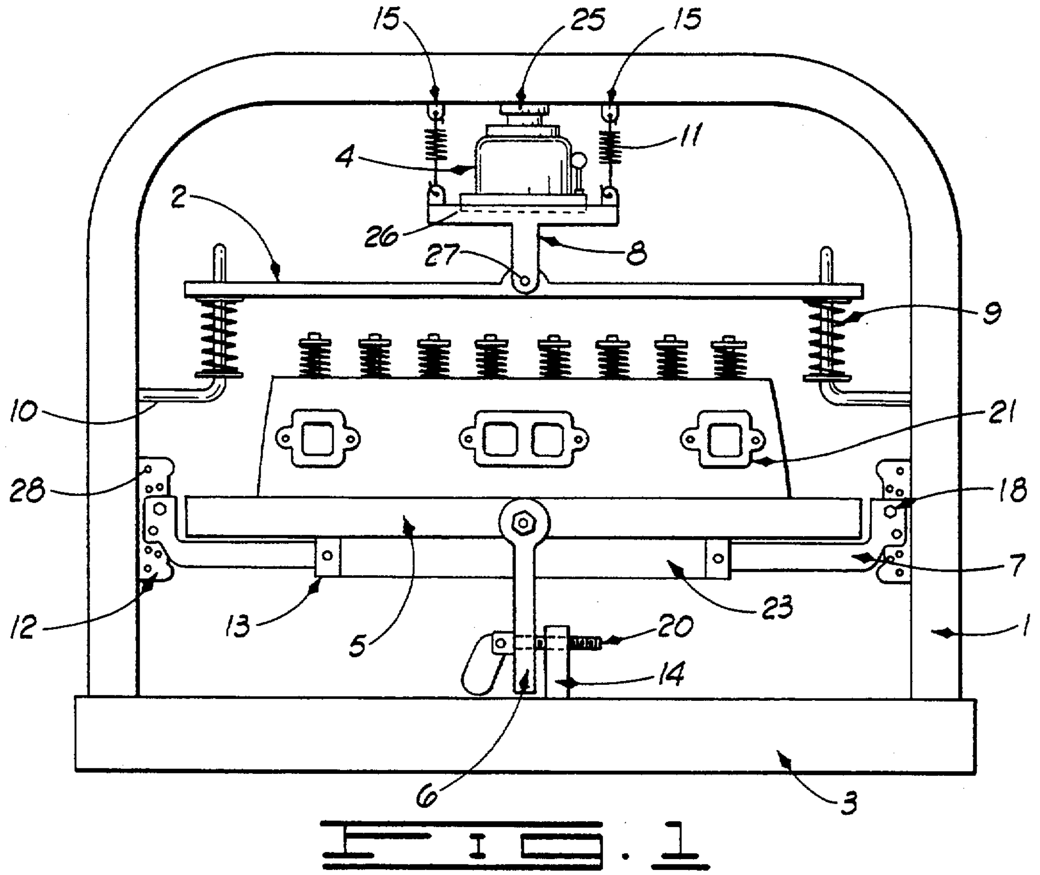
FIG. 1 is a front view of the invitation, with a cylinder head inplace.
Figure 2:
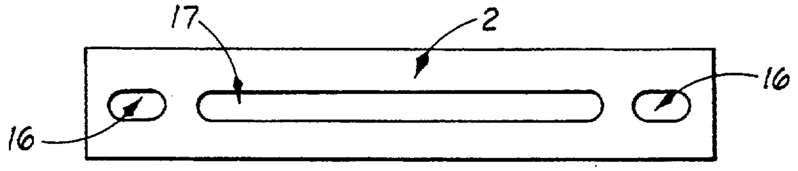
FIG. 2 is an overhead view of the compression plate.
Figure 3:
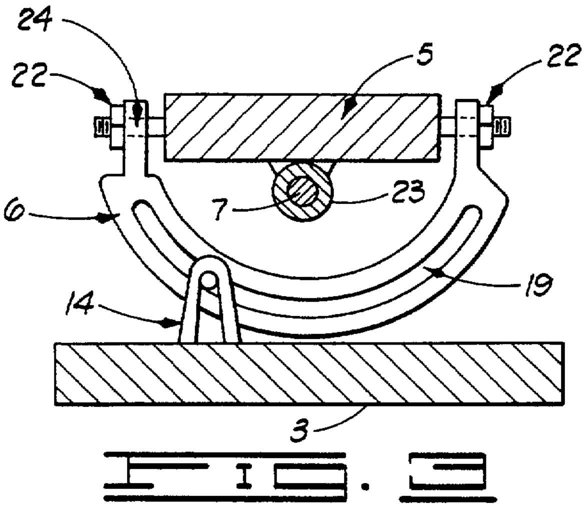
FIG. 3 is a site view of the base, pivot bracket and head mounting table.

Referring to FIGS. 1–3, there is shown one embodiment of this invention, wherein a multiple valve spring compressor consists of an upper frame (1), being of a rectangular u-shape and is connected on both ends to a base (3), which is rectangular in shape.

An expandable device (4), for supplying compression force, is attached to the upper frame (1), by inserting the piston or upper portion of the expandable device into a holding collar (25), located at the upper frames center point, thus allowing a wide variety of expandable devices to be used inorder to supply compression force.

The expandable devices lower portion or base rests on top of a power link (8),which has a square platform with retaining edges (26), to contain the expandable device (4), thereon and an attachment point for a compression plate (2), on it's underside. The expandable device (4), and power link (8), are held in a neutral position and are returned to such position by return springs (11), attached at one end to the upper frame (1), and at the other end to the poweer link (8).

The power link (8),is connected at it's lower portion to a compression plate (2), by a threaded fastener (27), and is allowed to pivot freely at this point.

In FIG. 2, we see an overhead view of the compression plate (2), there is an elongated slot (17), in the center, for allowing access to valve stems and valve locks, which will pass thru the elongated slot (17), in the compression plate (2), when performing a compression operation of valve springs for removal or installation. An alignment hole (16), of an elongated shape, is located at each end of the compression plate (2).

In FIG. 1, there are alignment studs (10), attached to each side of the upper frame (1), the alignment studs (10), extend upward and pass thru the alignment holes (16), of the compression plate (2). There are compression plate return springs (9), attached to the alignment studs (10), the compression plate return springs (9), contact the underside of the compression plate (2), and help to return the compression plate (2), to a neutral position, when compression force has been released during operation.

Directly under the alignment studs (10), on both sides of the upper frame (1), there are multi-position brackets (12), which have multiple holes (28), for attachment of a tilt bar (7), and to allow the said tilt bar to be positioned to a variety of different angles. The tilt bar (7) is attached to the multiposition brackets (12), by threaded fasteners (18). Centered on the tilt bar (7), is a head mounting table (5), a cylinder head (21), is placed on the head mounting table for removing or installing valve springs. Located underneath the head mounting table (5), at it's center is a pivot collar (23), which allows the head mounting table (5), to maintain it's position on and tilt in conjunction with the tilt bar (7), while it also allows the head mounting table (5), to pivot on an axis parallel with the tilt bar (7). The Pivot collar (23), thus allows the Head mounting table (5), to tilt front to rear, while simultaneously allowing the head mounting table to tilt side to side; if needed, due to the tilt bar's (7), range of adjustibility in tilt due to it's mounting onto the multi-position brackets (12). The degree of front to rear tilt that the head mounting table (5), has on the pivot collar (23), is locked in place by a pivot bracket (6), shown in FIG. 3, which is bolted to the head mounting table, a threaded fastener (20), passes thru the pivot bracket (6), and into a pivot boss (14), shown in FIG. 3 which is part of the base (3), upon tightening the fastener (20), the pivot bracket (18), is locked inplace and thus the head mounting table's front to rear tilt is locked inplace aswell.

There are positioning stops (13), at each end of the pivot collar (23), which center the pivot collar on the tilt bar (7).

In FIGS. 1 and 3, we see a pivot bracket (6), which is connected to the head mounting table (5), by threaded fasteners (22), passing thru mounting holes (24), located at each end of the pivot bracket (6), the pivot bracket, pivots at these points and thus allow the tilt bars (7), tilt angle to be changed; if needed, while the head mounting table's position of pivot, is maintained.

In FIG. 3, we can see that the pivot bracket (6), is of a curved shape and has a curved elongated slot (19), which a threaded fastener (20); shown in FIG. 1, passes thru and threads into the pivot boss (14), and upon tightening, locks the pivot bracket (6), inplace, so as to hold the head mounting table (5), at any desired pivot angle.

Once the desired tilt and pivot angle for a particular cylinder head has been selected, a cylinder head can be placed upon the head mounting table and upon actuation of the expandable device, the force is transferred to the compression plate inorder to compress the cylinder head's valve springs, so as to allow their removal or installation.

What is claimed is:

1. A Multiple Valve Spring compressor, comprising: a base of rectangular shape having a means for and is attached at each end to an upper frame member, said upper frame member being positioned vertically, comprising a rectangular u-shape and having a means for connection of an expandable device at it's center, which is used as a means of supplying force to compress multiple valve springs, the expandable device is attached on it's opposite end to a power link, said power link having a square platform with a means for attachment to a compression plate, said power link and upper frame member having a means for attachment of return springs which position the expandable device and power link in place, said upper frame member having a means for alignment of the compression plate; which contacts valve spring retainers during operation, said compression plate being of a rectangular shape and having an elongated slot as a means to allow valve stems and locks to pass thru for access during the compression operation, the said compression plate having a means for positioning and alignment with said upper frame member, said compression plate having a means for attachment to said expandable device, said upper frame member having brackets with a means for attachment of a tilt bar, said brackets having means for allowing the tilt bar to be attached at various positions as a means for adjustment of tilt angle of the tilt bar, said tilt bar having means for attachment to said brackets, said tilt bar having a pivot collar placed onto the tilt bar with a means for locating the pivot collar in place, said pivot collar having a means for attachment to a head mounting table as a means for allowing the head mounting table to be in place on the tilt bar while allowing the head mounting table to pivot, said head mounting table being rectangular in shape, said head mounting table having a means for attachment to a pivot bracket, said pivot bracket being curved with a curved elongated slot which a threaded fastener passes thru as a means for attachment to the said base, at the base's pivot boss, which upon tightening said threaded fastener, the said pivot bracket is held inplace on the pivot boss as a means for holding the head mounting table at a selected pivot angle.

* * * * *